US012329187B2

(12) United States Patent
Hilliard et al.

(10) Patent No.: US 12,329,187 B2
(45) Date of Patent: *Jun. 17, 2025

(54) TUBER PEELING APPARATUS AND METHOD

(71) Applicant: Frito-Lay Trading Company GmbH, Bern (CH)

(72) Inventors: Greg Hilliard, Leicester (GB); Mick Anderson, Leicester (GB); Fred Bourg, Plano, TX (US); Terry Connell, Leicester (GB)

(73) Assignee: Frito-Lay Trading Company GmbH, Spitalgasse (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,667

(22) Filed: Dec. 11, 2023

(65) Prior Publication Data
US 2024/0099352 A1   Mar. 28, 2024

Related U.S. Application Data

(63) Continuation of application No. 17/040,815, filed as application No. PCT/EP2019/057767 on Mar. 27, 2019, now Pat. No. 11,877,588.

(30) Foreign Application Priority Data

Mar. 27, 2018 (GB) .................................. 1804911

(51) Int. Cl.
*A23N 7/02* (2006.01)
*A23L 19/12* (2016.01)
(Continued)

(52) U.S. Cl.
CPC ................ *A23N 7/02* (2013.01); *A23L 19/14* (2016.08); *A23N 15/00* (2013.01); *B07B 1/12* (2013.01);
(Continued)

(58) Field of Classification Search
CPC ..... A23N 7/02; A23N 15/00; A23N 2015/008; A23L 19/14; B07B 13/07; B07B 1/12; A23V 2002/00
(Continued)

(56) References Cited

U.S. PATENT DOCUMENTS 1,436,124 A * 11/1922 Villenauve ................ A23N 7/02
                                                           99/591
2,169,707 A *  8/1939 Obermeit .................. A23N 7/02
                                                          451/180
(Continued)

FOREIGN PATENT DOCUMENTS

NL    7413554    4/1976
WO    93/11882   6/1993

OTHER PUBLICATIONS

International Search Report issued in PCT/EP2019/057767 on Jun. 24, 2019.
Written Opinion issued in PCT/EP2019/057767 on Jun. 24, 2019.

*Primary Examiner* — Eric S Stapleton
(74) *Attorney, Agent, or Firm* — Barnes & Thornburg LLP; G. Peter Nichols (57) ABSTRACT

A method of peeling tubers includes providing a peeler device defining a cavity surrounded by a peeling mechanism, inputting tubers to be peeled into the cavity, directing electromagnetic radiation from an illumination device into the cavity-detecting electromagnetic radiation reflected into lens of a camera from tubers located in the cavity during a peeling operation by the peeling mechanism, and operating the peeler device based on the reflected electromagnetic radiation detected by the camera. Also disclosed is an apparatus for carrying out the method.

19 Claims, 3 Drawing Sheets

(51) Int. Cl.
*A23N 15/00* (2006.01)
*B07B 1/12* (2006.01)
*B07B 13/07* (2006.01)

(52) U.S. Cl.
CPC ........ *B07B 13/07* (2013.01); *A23N 2015/008* (2013.01); *A23V 2002/00* (2013.01)

(58) Field of Classification Search
USPC ........................................................ 426/231
See application file for complete search history.

(56) References Cited

U.S. PATENT DOCUMENTS

| | | | | |
|---|---|---|---|---|
| 2,295,190 A * | 9/1942 | Zenge | ............... | B07B 13/00 209/393 |
| 3,211,289 A * | 10/1965 | Brumagin | ............... | B07B 13/07 209/931 |
| 4,253,574 A * | 3/1981 | Ross | ............... | B07B 1/14 209/940 |
| 4,347,937 A * | 9/1982 | Reich | ............... | B07B 15/00 209/622 |
| 4,763,794 A * | 8/1988 | Billington, III | ....... | B07B 13/07 209/625 |
| 4,831,922 A * | 5/1989 | Cogan | ............... | B07C 5/3422 356/625 |
| 5,440,127 A * | 8/1995 | Squyres | ............... | G01N 21/8806 250/341.8 |
| 5,464,981 A * | 11/1995 | Squyres | ............... | B07C 5/3422 250/341.8 |
| 5,482,166 A * | 1/1996 | Brown | ............... | A22C 17/002 209/939 |
| 5,529,169 A * | 6/1996 | Wilbur | ............... | B07C 5/366 209/576 |
| 5,791,497 A * | 8/1998 | Campbell | ............... | B07C 5/3422 209/587 |
| 5,884,775 A * | 3/1999 | Campbell | ............... | B07C 5/3422 250/341.8 |
| 5,941,395 A * | 8/1999 | Aho | ............... | B07B 1/12 209/396 |
| 6,252,189 B1 * | 6/2001 | Campbell | ............... | B07C 5/3422 250/341.8 |
| 6,748,837 B2 * | 6/2004 | Benjamin | ............... | B26D 3/30 83/932 |
| 9,463,493 B1 * | 10/2016 | Arlinghaus | ........ | B07C 5/3425 |
| 11,877,588 B2 * | 1/2024 | Hilliard | ............... | A23N 7/02 |
| 2002/0008055 A1 * | 1/2002 | Campbell | ............... | G01N 21/31 250/221 |
| 2002/0142084 A1 * | 10/2002 | Elizondo | ............... | A23N 7/02 426/482 |
| 2002/0166431 A1 * | 11/2002 | Benjamin | ............... | B26D 7/01 83/423 |
| 2002/0185014 A1 * | 12/2002 | Ismail | ............... | A23N 7/02 99/584 |
| 2003/0075058 A1 * | 4/2003 | Schroeder | ............... | A23N 7/02 99/584 |
| 2004/0146615 A1 * | 7/2004 | McDonald | ............... | G01N 33/02 426/231 |
| 2005/0122524 A1 * | 6/2005 | Ibarra | ............... | G01N 21/8806 356/445 |
| 2005/0204937 A1 * | 9/2005 | Baird | ............... | A23N 7/02 99/623 |
| 2005/0218589 A1 * | 10/2005 | Shearer | ............... | A23N 7/02 273/112 |
| 2005/0274266 A1 * | 12/2005 | Wallace | ............... | A47J 17/18 99/623 |
| 2012/0027693 A1 * | 2/2012 | Bean | ............... | A23L 2/52 514/474 |
| 2012/0321759 A1 * | 12/2012 | Marinkovich | ........ | A61B 5/442 356/402 |
| 2015/0138538 A1 * | 5/2015 | Sakurai | ............... | G01J 3/26 356/72 |
| 2017/0143020 A1 * | 5/2017 | Kroef | ............... | B07C 5/3422 |

* cited by examiner

TUBER PEELING APPARATUS AND METHOD

This application is a continuation application of U.S. patent application Ser. No. 17/040,815 filed Sep. 23, 2020, which was a U.S. nationalization under 35 U.S.C. § 371 of International Patent Application No. PCT/EP2019/057767, filed Mar. 27, 2019, which claims priority to GB Application No. 1804911.4, filed Mar. 27, 2018; the entire contents of each are incorporated herein by reference.

BACKGROUND

The present invention relates to an apparatus for peeling tubers and to a method of peeling tubers. The present invention has particular application to the peeling of potatoes for the manufacture of snack food such as potato chips.

In the processing of edible tubers, for example potatoes, sweet potatoes or any other edible tuber, or mixture of edible tubers, for the manufacture of processed food, for example potato chips or French fries, it is known that the edible tubers need to be peeled. The tubers need to be peeled sufficiently to remove the entire peel, otherwise the quality of the processed food can be compromised. This particularly applies to the manufacture of potato chips. However, if the tubers are peeled excessively to ensure that every tuber is fully peeled, peel waste can be excessive, and otherwise useful flesh of the tuber can be wasted, reducing production yield.

In commercial food production, for example in the manufacture of potato chips, commercial peelers have a high production rate, for example 3 tonnes per hour of potatoes to be peeled. There is a problem to achieve a high volume production of peeled potatoes which achieves not only a high and uniform product quality but also minimizes waste, and without reducing production rates.

U.S. Pat. No. 4,147,619 discloses an apparatus for sorting items, such as peeled whole potatoes, which, in the absence of abnormalities, exhibit a substantially uniform light reflectivity, includes an illumination chamber through which the items to be sorted are passed successively as a stream. Light sensors are focused on a cross-sectional slice of the illumination chamber through which the items pass, each of these light sensors being focused on only a small portion of the slice. Electronic circuitry in conjunction with the light sensors counts the number of such sensors sensing abnormalities. If the number of sensors sensing abnormalities is greater than a predetermined minimum, a reject signal is produced. This disclosure rejects potatoes having defects. There is no improvement in the peeling operation.

U.S. Pat. No. 5,884,775 discloses a system and method of operation performing automated optical inspection to remove peel-bearing defective potato pieces from a random mixture of peel-bearing defective and acceptable potato pieces use near infrared light as a source of illumination. The system implements a method of illuminating the mixture with near infrared light, detecting light reflected by the potato pieces under inspection, identifying defective potato piece surface regions based on the detected reflections, and removing the defective items from the mixture. The system and method the system implements permit the inspection of peel bearing potato pieces for the presence of peel covered defects. Again, there is no improvement in the peeling operation.

WO-A-9311882 discloses an optical device for controlling and sorting individual objects in free fall comprises a laser scanner located on the periphery of a control zone whose reflected light is collected from all sides by the ends of light guides and transmitted to a controller for evaluation purposes. The controller controls a sorting device downstream of the control zone according to predetermined control criteria. A light guide strip which surrounds the control area captures the reflected light is controlled according to the direct light sensed. This device is particularly useful for sorting peeled potatoes and wet products. Again, there is no improvement in the peeling operation.

Consequently, there is a need for an improved method and apparatus for peeling edible tubers on a commercial scale.

In addition, there is a need to reduce or minimize waste of tuber flesh to provide an increased yield of peeled tuber product obtained from a given mass of the unpeeled tuber product.

There is a further need to provide a peeling apparatus which can achieve these objectives without significant capital expense, and preferably be retrofitting existing peelers with an enhanced peeling module.

The present invention aims at least partially to meet these needs.

SUMMARY

In a first aspect, the invention provides an apparatus for peeling tubers, the apparatus comprising:
  a peeler device defining a cavity surrounded by a peeling mechanism, the peeler device having an input connected to the cavity for inputting tubers to be peeled into the cavity;
  an illumination device for directing electromagnetic radiation into the cavity;
  a camera having a lens defining a field of view, the field of view being oriented into the cavity, the camera being arranged for detecting electromagnetic radiation reflected into the lens from tubers located in the cavity during a peeling operation by the peeling mechanism; and
  an operating system for operating the peeler device based on the reflected electromagnetic radiation detected by the camera, the operating system comprising:
  a sampler for sequentially measuring a plurality of intensity values of the detected electromagnetic radiation;
  a comparator for comparing the measured intensity values to determine a rate of change of the measured intensity values; and
  a controller for controlling the peeler device in response to the rate of change of the measured intensity values.

In a second aspect the invention provides a method of peeling tubers, the method comprising the steps of:
  a. providing a peeler device defining a cavity surrounded by a peeling mechanism;
  b. inputting tubers to be peeled into the cavity;
  c. directing electromagnetic radiation from an illumination device into the cavity;
  d. detecting electromagnetic radiation reflected into lens of a camera from tubers located in the cavity during a peeling operation by the peeling mechanism; and
  e. operating the peeler device based on the reflected electromagnetic radiation detected by the camera.

Optional or preferred features are defined in the respective dependent claims.

In preferred embodiments, the present invention provides a peeler device with an operating system for controlling the peeling function so the peeling function is terminated after a preset degree of peeling has been achieved. Both underpeeling, which reduces the quality of the peeled product, and over-peeling, which increases tuber wastage without increasing the quality of the peeled product, can be avoided.

The peeling function can be controlled so that a precise and uniform degree of peeling is achieved within a batch of tubers, with the peeling control being achieved in real-time and dynamically during the peeling operation.

A high quality peeled tuber product can be consistently achieved without excessive product wastage.

The operating system for controlling the peeling function can readily be fitted, or retro-fitted, to a peeler device, such as a current commercial peeler.

In a third aspect, the present invention also provides a device for sorting tubers, the device comprising: a plurality of sorting zones serially arranged along a conveying direction from a tuber supply end, wherein each sorting zone comprises an array of mutually aligned bars forming a grid, the bars in each sorting zone being mutually separated by a respective spacing distance, wherein the spacing distance in the first sorting zone, which is located towards the tuber supply end, is smaller than the spacing distance in the second sorting zone which is downstream, along the conveying direction, from the first sorting zone, whereby tubers smaller than a first threshold size fall though the bars of the first sorting zone and tubers larger than the first threshold size are conveyed along the bars of the first sorting zone to the second sorting zone.

In a fourth aspect, the present invention further provides a method of sorting tubers, the method comprising the steps of:
  i. providing a tuber sorting device comprising a plurality of sorting zones serially arranged along a conveying direction from a tuber supply end, wherein each sorting zone comprises an array of mutually aligned bars forming a grid, the bars in each sorting zone being mutually separated by a respective spacing distance, wherein the spacing distance in the first sorting zone, which is located towards the tuber supply end, is smaller than the spacing distance in the second sorting zone which is downstream, along the conveying direction, from the first sorting zone, and
  ii. supplying tubers at from a tuber supply end whereby the tubers are conveyed along the conveying direction, whereby tubers smaller than a first threshold size fall though the bars of the first sorting zone and tubers larger than the first threshold size are conveyed along the bars of the first sorting zone to the second sorting zone.

Again, optional or preferred features are defined in the respective dependent claims.

BRIEF DESCRIPTION OF THE DRAWINGS

Embodiments of the present invention will now be described by way of example only with reference to the following drawings, in which.

DETAILED DESCRIPTION

The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

Figure 1:
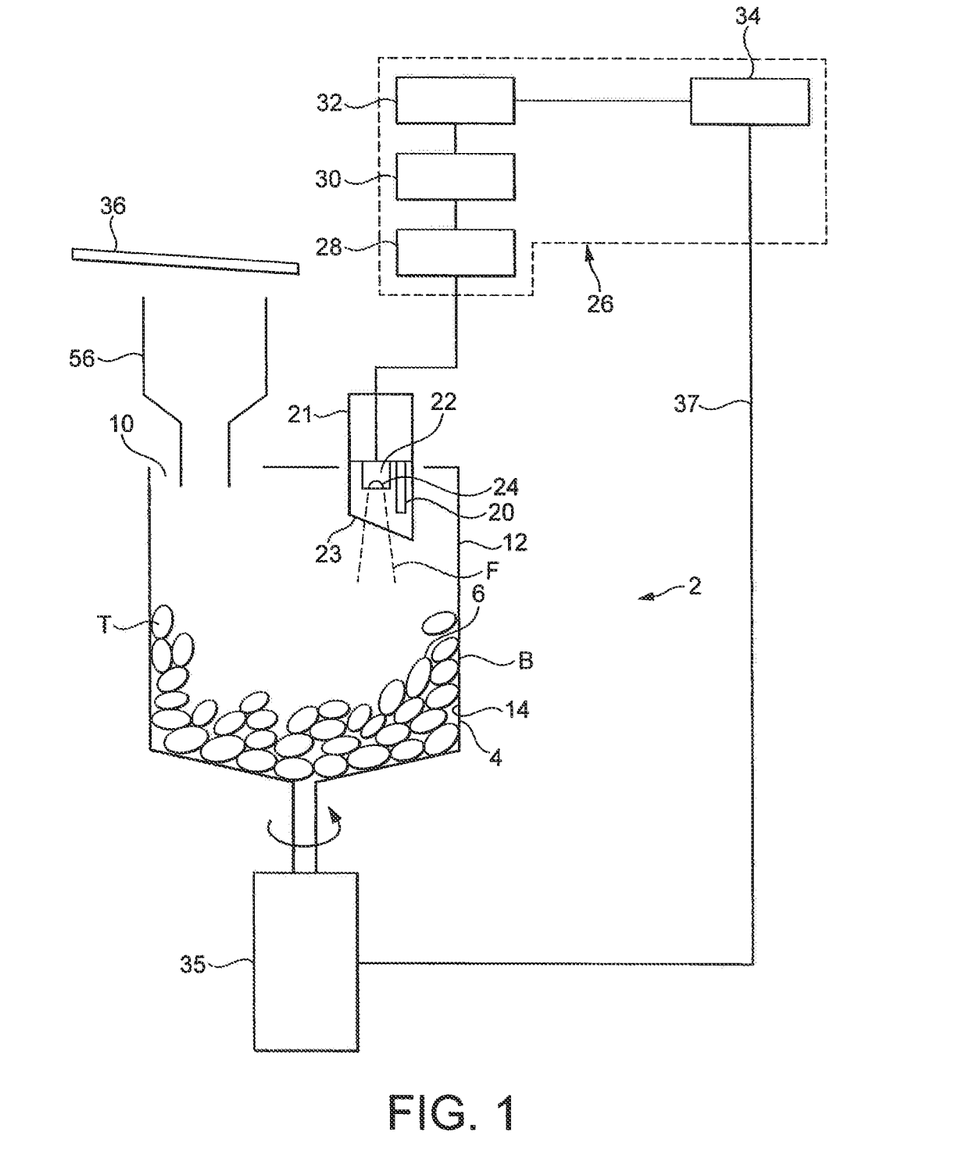
FIG. 1 is a schematic side view of an apparatus for peeling tubers according to an embodiment of the present invention.
Figure 2:
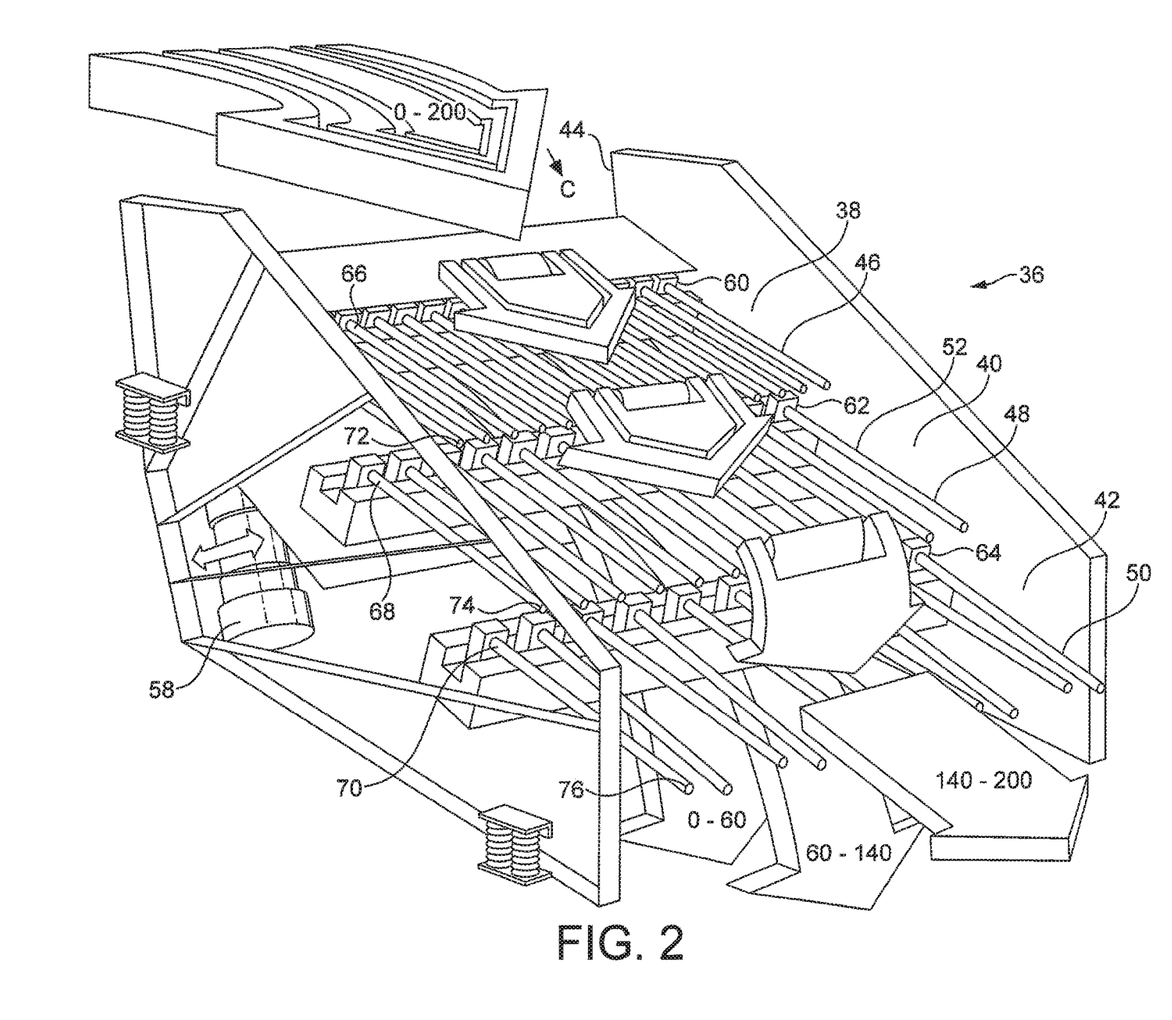
FIG. 2 is a close-up perspective view of the tuber sorting device of FIG. 1.

Referring to FIGS. 1 and 2, there is shown an apparatus 2 for peeling tubers according to an embodiment of the present invention. The tubers may comprise any edible tuber, or mixture of edible tubers, and the present invention has particular application to the peeling of potatoes, for example for the manufacture of processed food, typically potato chips or French fries.

The apparatus 2 comprises a peeler device 4 defining a cavity 6 surrounded by a peeling mechanism 8. The peeler device 4 has an input 10 connected to the cavity 6 for inputting tubers to be peeled into the cavity 6.

The peeling mechanism 8 is typically a known commercially used device, and comprises a rotatable cylinder 12 having an abrasive inner cylindrical surface 14. When the peeling mechanism 8 is operated, the tubers within the cavity 6 are urged radially outwardly under a centrifugal force as a result of rotation of the rotatable cylinder 12, and the tubers are abraded against the abrasive inner cylindrical surface 14. A flow of water (not shown) into the cavity 6 can wash away the abraded peel material.

In accordance with this invention, the peeler device 4 is provided with an operating system for controlling the peeling function so the peeling function is terminated after a preset degree of peeling has been achieved. Both under-peeling, which reduces the quality of the peeled product, and over-peeling, which increases tuber wastage without increasing the quality of the peeled product, can be avoided. The peeling function can be controlled so that a precise and uniform degree of peeling is achieved within a batch of tubers, with the peeling control being achieved in real-time and dynamically during the peeling operation. A high quality peeled tuber product can be consistently achieved without excessive product wastage.

Accordingly, an illumination device 20 is provided above the cavity 6 for directing electromagnetic radiation into the cavity 6. The illumination device 20 is adapted to generate electromagnetic radiation within a wavelength range which can permit the reflected radiation to indicate the properties of the peeled product. The electromagnetic radiation can be within the visible region of the electromagnetic spectrum, or in the infrared (IR) or ultraviolet (UV) regions of the electromagnetic spectrum.

The illumination device 20, typically has any suitable form of illumination element, such as a light emitting diode (LED) or an incandescent filament, is adapted to generate electromagnetic radiation within the wavelength range of from 490 to 780 nm, this being within the visible region of the electromagnetic spectrum.

In one embodiment, the illumination device 20 is adapted to generate electromagnetic radiation within the wavelength range of from 490 to 570 nm, and the electromagnetic radiation may be green in colour.

In another embodiment, the illumination device 20 is adapted to generate electromagnetic radiation within the wavelength range of from 620 to 780 nm, and the electromagnetic radiation may be red in colour.

It has been found that, when controlling the peeling of potatoes in accordance with the illustrated embodiment of the present invention, red or green light has a higher sensitivity to indicating the peeling degree using reflected light as compared to, for example, blue light.

A camera 22 is provided above the cavity 6. The camera 22 has a lens 24 defining a field of view F. The field of view F is oriented into the cavity 6. The camera 44 is arranged for detecting electromagnetic radiation reflected into the lens 24 from tubers T located in the cavity 6 during a peeling operation by the peeling mechanism 8.

Preferably, the illumination device 20 and the camera 22 are surrounded by a tubular enclosure 21, for example composed of stainless steel, having a lower window 23, for example composed of a polymer such as PMMA, which protects the illumination device 20, the camera 22 and in particular the lens 24 from debris produced during the peeling operation. The window 23 is inclined at an angle to the optical axis of the camera 22, and in use is inclined to the vertical, and can readily be cleaned after a peeling operation.

The apparatus 2 further comprises a processor-controlled operating system 26 for operating the peeler device 4 based on the reflected electromagnetic radiation detected by the camera 22.

The operating system 26 comprises a sampler 28 for sequentially measuring a plurality of intensity values of the detected electromagnetic radiation. The sampler 28 is adapted to measure a preset number of intensity values of the detected electromagnetic radiation. Typically the preset number of intensity values is from 5 to 50, or from 10 to 30. The sampler 28 is adapted to measure the preset number of intensity values over a preset time period. The preset time period may be from 0.5 to 2 seconds typically from 0.5 to 1.5 seconds, for example about 1 second.

The operating system 26 further comprises a calculator 30 for calculating an average intensity value representing an average intensity value associated with a particular first time period.

The operating system 26 further comprises a comparator 32 for comparing the measured intensity values to determine a rate of change of the measured intensity values.

The calculator 30 is arranged to output the average intensity value to the comparator for comparison against at least one other calculated average intensity value associated with a different first time period than the particular first time period.

The calculator 30 is arranged to output to the comparator from 2 to 10 average intensity values, for example from 2 to 6 average intensity values.

The calculator 30 is arranged to output to the comparator 32 the plurality of average intensity values which represent the intensity values measured over a second time period. The second time period may be from 1 to 10 seconds, typically from 1 to 5 seconds, for example from 2 to 4 seconds. A preferred value is 3 seconds.

The operating system 26 further comprises a controller 34 for controlling the peeler device 4 in response to the rate of change of the measured intensity values. The controller 34 is adapted to control the peeler device 4 in response to the rate of change of the measured intensity values when, for example, the rate of change is less than 10% of the measured intensity values, typically less than 5% of the measured intensity values, more typically less than 2% of the measured intensity values, for example less than 1% of the measured intensity values.

In other words, the controller 34 is adapted to control the peeler device 4 when the rate of change of the average intensity values is so low that the averaged intensity value changes over the second time period, for example 3 seconds, by less than 10%, typically less than 5%, more typically less than 2%, for example less than 1%, over the second time period. Such a low change in the average intensity value over a given time period indicates that the reflection intensity is levelling off to the final constant value, independent of the actual final constant value of the reflection intensity, which can vary from batch to batch of tubers.

In one embodiment, the operating system 26 is adapted to terminate operation of the peeler device 4, either immediately or following a first predetermined time delay, after the rate of change of the measured intensity values reaches a first preset threshold value.

In another embodiment, the operating system 26 is adapted to cause peeled tubers to be outputted from the cavity 6, either immediately or following a first predetermined time delay, after the rate of change of the measured intensity values reaches a first preset threshold value.

In a further embodiment, the operating system 26 is adapted to terminate operation of the peeler device 4, or to cause peeled tubers to be outputted from the cavity 6, either immediately or following a second predetermined time delay, when the rate of change of the measured intensity values is below a second preset threshold value at the expiry of a minimum time period from commencement of a peeling cycle by the peeler device 4.

The operating system 26 may be configured to terminate operation of the peeler device 4 by switching off power to a drive motor 35 for the peeler device 4. For example, a control signal may be sent from the controller 34 to the drive motor 35 along a control line 37.

In a preferred embodiment, the operating system 26 is adapted to detect a spike of reflected electromagnetic radiation detected by the camera 8, and to output a calibration signal in response thereto.

Referring to FIG. 2, the apparatus 2 further comprises a tuber sorting device 36 coupled, directly or indirectly, to the input 10 of the peeler device 4. The tuber sorting device 36 can feed tubers of a selected size range to the peeler device 4.

The tuber sorting device 36 comprises a plurality of sorting zones 38, 40, 42 serially arranged along a conveying direction C from a tuber supply end 44. Each sorting zone 38, 40, 42 comprises an array of mutually aligned bars 46, 48, 50 forming a grid 52. The grid 52 is inclined downwardly from the tuber supply end 44, and the bars 46, 48, 50 are rotated or otherwise moved by a drive mechanism 58, to cause the tubers to move along the bars 46, 48, 50 from the tuber supply end 44. The bars 46, 48, 50 may be eccentrically mounted at an upstream end 66, 68, 70 thereof to a drive device 60, 62, 64 and the downstream end 72, 74 76 of the bars 46, 48, 50 may be free.

The bars 46, 48, 50 in each sorting zone 38, 40, 42 are mutually separated by a respective spacing distance d1, d2, d3. The spacing distance d1 in the first sorting zone 38, which is located towards the tuber supply end 44, is smaller than the spacing distance d2 in the second sorting zone 40 which is downstream, along the conveying direction C, from the first sorting zone 38. Accordingly, in operation, tubers smaller than a first threshold size d1 fall though the bars 46 of the first sorting zone 38 and tubers larger than the first threshold size d1 are conveyed along the bars 46 of the first sorting zone 38 to the second sorting zone 40.

Typically, the second sorting zone 40 is configured such that in the second sorting zone 40 tubers smaller than a second threshold size d2 fall though the bars 48 of the second sorting zone 40 and tubers larger than the second threshold size d2 are conveyed along the bars 48 of the second sorting zone 40 to a third sorting zone 42. The third sorting zone 42 may permit all of the remaining tubers to be fed to the peeler device 4. Alternatively, the third sorting zone 42 may correspondingly sort tubers smaller than a third threshold size d3 by falling though the bars 50 of the third sorting zone 52 and tubers larger than the third threshold size d3 are conveyed along the bars 50 of the third sorting zone 52 to a fourth sorting zone (not shown) or to an output end 54 of the tuber sorting device 36.

The spacing distances d1, d2, d3 are selected to provide desired individual potato size populations for subsequent processing, e.g. peeling. For example, the spacing distance d1 in the first sorting zone may be 60 mm+/−20 mm, the spacing distance d2 in the second sorting zone may be 140 mm+/−20 mm, and the spacing distance d3 in the third sorting zone may be 200 mm+/−20 mm.

In the illustrated embodiment of FIG. 2, the spacing distances d1, d2, d3 are, respectively, 60 mm, 140 mm and 200 mm. Therefore the first sorting zone 38 sorts out tubers of dimension of 60 mm or less, the second sorting zone 40 sorts out tubers of dimension greater than 60 mm to up to 140 mm, and the third sorting zone 42 sorts out tubers of dimension greater than 140 mm to up to 200 mm. The three sorting zones 38, 40, 42 serially arranged along the conveying direction C can sort an initial tuber supply having various tuber dimensions within the range of from 0 to 200 mm into three sorted groups of different tuber dimensions. This means that each group has a more statistically uniform dimensional range, which has been found to enhance the uniformity of the peeling operation for any give batch of tubers.

Referring back to FIG. 1, which shows a single sorting zone of the sorting device 36, a hopper 56 is disposed beneath a respective sorting zone 38, 40, 42 of at least one of the plurality of sorting zones 38, 40, 42 for receiving tubers falling though the bars 46, 48, 50 of the respective sorting zone 38, 40, 42. In the preferred embodiment, a plurality of the peeler devices 4 and a plurality of hoppers 56 are provided, each hopper 56 being connected to the input of a respective one, or more than one, of the peeler devices 4. Typically, each hopper 56 is connected to the input 10 of the respective peeler device(s) 4. In the preferred embodiment, each hopper 56 is connected to the input 10 of two peeler device(s) 4.

The method of peeling tubers will now be described with reference to FIG. 3 which is a graph showing the relationship between reflected electromagnetic radiation and time according to a first example of the method of peeling tubers using the apparatus of FIG. 1.

In the method of peeling tubers, tubers (e.g. potatoes) to be peeled, typically as a batch of a pre-defined weight, are inputted through the input 10 into the cavity 6 of the peeler device 4. The peeling mechanism 8 is operated by rotation, causing the tubers to be peeled by abrasion against the abrasive inner cylindrical surface 14.

During the peeling operation, the illumination device 20 directs electromagnetic radiation into the cavity 6, and thereby onto the tubers that are being progressively peeled. Simultaneously, the camera 22 detects electromagnetic radiation that has been reflected into lens 24 of the camera 22 from the tubers located in the cavity 6 during the peeling operation by the peeling mechanism 8.

As described above, the illumination device 20 preferably emits electromagnetic radiation within the wavelength range of from 490 to 570 nm, and the electromagnetic radiation may be green in colour. Alternatively, in another preferred embodiment, the illumination device 20 emits electromagnetic radiation within the wavelength range of from 620 to 780 nm, and the electromagnetic radiation may be red in colour. It has been found that, when controlling the peeling of potatoes in accordance with the illustrated embodiment of the present invention, red or green light has a higher sensitivity to indicating the peeling degree using reflected light as compared to, for example, blue light.

The initial unpeeled tubers have a low reflectivity for the electromagnetic radiation, whereas in contrast the final peeled tubers have a high reflectivity for the electromagnetic radiation. The increase of detectable reflected radiation during the peeling operation is utilized to control the peeling operation so that the peeling operation is terminated after a preset degree of peeling has been achieved. The operation of the peeler device is therefore controlled based on the reflected electromagnetic radiation detected by the camera.

In particular, it has been found by the present inventors, after extensive research work, that the reflection intensity has a particular relationship with peeling time during the peeling operation and that the reflection intensity varies from batch to batch for the tubers, and can vary between different tuber varieties.

In particular, tubers do not have a consistent reflection intensity for different batches of tubers for the same variety; for example the colour of the flesh of potatoes of the same variety can vary from batch to batch and in particular can vary depending on the harvest or storage time of the potatoes (as potatoes age during storage the flesh colour changes, and typically darkens with age).

Furthermore, different tuber varieties have different skin colours and different flesh colours.

Consequently, it is not feasible, in order to achieve accurate peeling control, simply to measure the reflection intensity and terminate the peeling operation after a minimum reflection intensity threshold has been achieved, because the threshold can varies from batch to batch, and no common threshold can be reliably utilized for sequential peeling operations achieving a high level of accuracy for the degree of peeling, thereby avoiding under-peeling, while avoiding wastage as a result of over-peeling.

The present invention is predicated on the finding that in order to achieve a high level of accuracy for the degree of peeling, the relationship between the reflection intensity and time should be determined and an analysis of the rate of change of the reflection intensity with time is determined and analyzed to provide a signal which is utilized to terminate the peeling operation.

Figure 3:
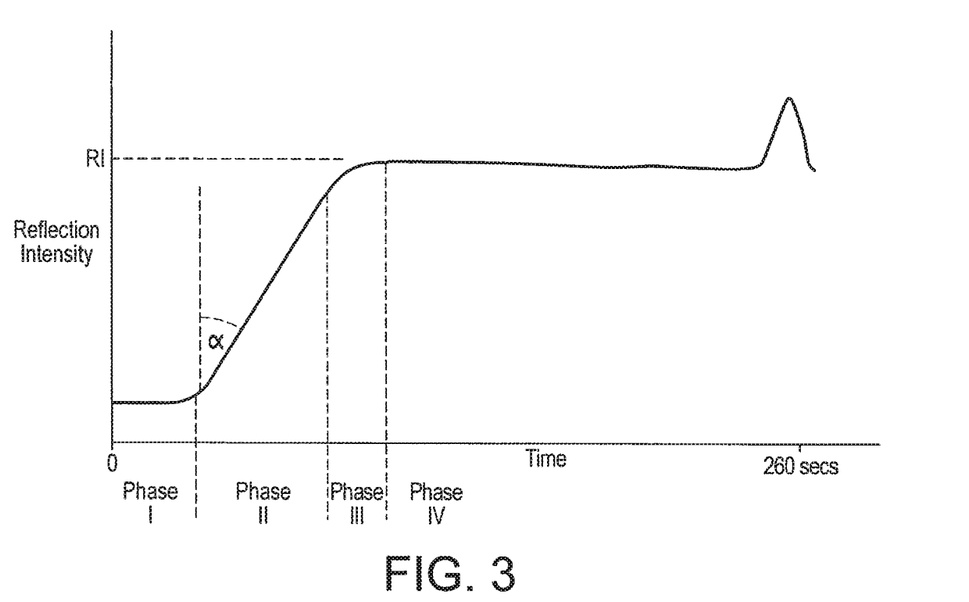
FIG. 3 is a graph showing the relationship between reflected electromagnetic radiation and time according to a first example of the method of peeling tubers using the apparatus of FIG. 1.

FIG. 3 is a graph for the variation of reflection intensity with time during the peeling operation for a typical potato variety used in the manufacture of potato chips, and which has light coloured skin.

Initially, in a first phase I, the reflection intensity has a constant low initial value. This is because the incident electromagnetic radiation from the illumination device 20 is reflected of the relatively dark skin, as compared to the flesh, of the potatoes, and also the input potatoes to be peeled may also be covered with mud or earth deposits.

Subsequently, in a second phase II, the skins of the potatoes are progressively removed by the peeling operation. As shown in FIG. 3, the reflection intensity increases, substantially linearly, from the low initial value as the potatoes are progressively peeled. As tubers skin is removed and the lighter coloured flesh is progressively revealed, the reflection intensity increases.

The rate of change of the reflection intensity in the second phase II can be represented by the angle α between the plot of the reflection intensity and the Y axis (ordinate); the smaller the angle α, the faster the peeling operation occurs. The angle α varies between different batches of the same potato variety and between different potato varieties.

Thereafter, in a third phase III, substantially all of the skins of the potatoes have been removed by the peeling operation. As shown in FIG. 3, the reflection intensity starts to level off to a final reflection intensity RI, representing the fully peeled status when only peeled flesh is present and all of the potato skin has been peeled away and removed. As discussed above, final reflection intensity RI varies between different batches of the same potato variety and between different potato varieties.

After the RI value has been achieved, there is a fourth phase IV in which the measured intensity remains constant while the peeled tubers are in the cavity 6 but the peeling operation has stopped. Obviously, if the peeled tubers are emptied from the cavity 6 after peeling the measured reflection intensity value would vary accordingly.

In the present invention, the rate of change of the reflection intensity with time which is measured in phase III is used to control the peeling operation.

In particular, during the peeling operation a plurality of reflection intensity values of the detected electromagnetic radiation are sequentially measured. For example, the reflection intensity is measured at a rate of from 5 to 50, or from 10 to 30, typically 20, measurements per second.

From this sequence, a preset number of intensity values of the detected electromagnetic radiation over a preset time period (called herein the "first time period") is measured by the sampler 28, and an average intensity value, representing an average intensity value associated with a particular first time period, is calculated by the calculator 30. The preset number of intensity values is typically from 5 to 50, preferably from 10 to 30, for example 20 and typically the preset time period is from 0.5 to 2 seconds, preferably from 0.5 to 1.5 seconds, for example about 1 second.

In the illustrated embodiment, the sampler measures 20 sample measurements of the reflection intensity over a 1 second period.

Then the calculator 30 calculates from the plurality of samples measured in the given time period (e.g. 20 samples measured in 1 second) an average reflection intensity value in that time period. This is achieved by a simple averaging algorithm in the calculator 30.

This provides a sequence of average intensity values over a sequence of successive time periods.

Thereafter, in the comparator 32 the average intensity value of a given time period is compared against at least one other calculated average intensity value associated with a different first time period than that particular given time period. This comparison is used to determine a rate of change of the measured intensity values.

In particular, in the illustrated embodiment from 2 to 10 average intensity values are used to determine a rate of change of the measured intensity values. Preferably, from 2 to 6 average intensity values, for example 3 average intensity values, are used to determine a rate of change of the measured intensity values.

The plurality of average intensity values represent the intensity values measured over a cumulative time period (called herein the "second time period") which is sufficiently long to ensure that the rate of change of the measure intensity with time is accurately detected to enable the levelling off of the reflection intensity, representative of the desired degree of peeling, to be reliably and consistently detected. Typically, the second time period is from 1 to 10 seconds, preferably from 1 to 5 seconds, more preferably from 2 to 4 seconds, for example about 3 seconds.

In the illustrated embodiment, the sampler 28 measures 20 sample measurements of the reflection intensity over a 1 second period (this being the first time period) and an average intensity value is calculated from those 20 sample measurements by the calculator 30. Then three successive 1 second periods, making a total of three seconds (this being the second time period), are used in the comparator 32 to determine the rate of change of the average intensity values over that total time period.

The determined rate of change is used by the controller 34 to control the termination of the peeling function.

The peeler device 4 is controlled in response to the rate of change of the measured intensity values. In particular, as the intensity levels off to a final constant reflection intensity value RI, the rate of change of the measured intensity values is progressively reduced in phase III. The peeler device may be controlled to terminate the peeling operation when the rate of change of the measured intensity values reaches a minimum threshold, for example is below a given rate of change.

In the illustrated embodiment, the peeler device 4 is controlled in response to the rate of change of the measured intensity values when the rate of change is less than 10% of the measured intensity values. Typically, the peeler device 4 is controlled in response to the rate of change of the measured intensity values when the rate of change is less than 5%, less than 2%, or less than 1%, of the measured intensity values.

When the rate of change of the measured intensity values reaches the minimum threshold, the peeling operation may be terminated either immediately or following a predetermined time delay, for example up to 5 seconds. The peeling operation may be terminated by terminating the operation of the peeling mechanism 8 or by causing peeled tubers to be outputted from the cavity 6, in either case either immediately or following a first predetermined time delay, after the rate of change of the measured intensity values reaches a first preset threshold value.

After a typical minimum time period within which it is assured that the peeling operation will have been terminated using the peeling operation control as described above, for example about 60 seconds, for a typical commercial potato peeler device having a 50 kg batch capacity and capable of producing 3 tonnes per hour of peeled potatoes, the lens window 23 is cleaned, for example by a spray of water or by a cleaning device.

This causes a spike S, shown in FIG. 3, of the measured intensity to be detected, since the electromagnetic radiation has a high level of reflection from any water or cleaning device located immediately adjacent to the window 23. The measured spike can be utilized to confirm that the illumination device 20 and camera 22 are functioning correctly, and therefore a subsequent peeling cycle on a further batch of tubers can be commenced, and thereby to calibrate the sensitivity of the camera 22 to detecting the reflected electromagnetic radiation.

FIG. 3 shows a typical plot for white and young potatoes exhibiting a significant and rapid increase in the reflection intensity during the peeling operation which levels off to a final constant reflection intensity value RI.

Figure 4:
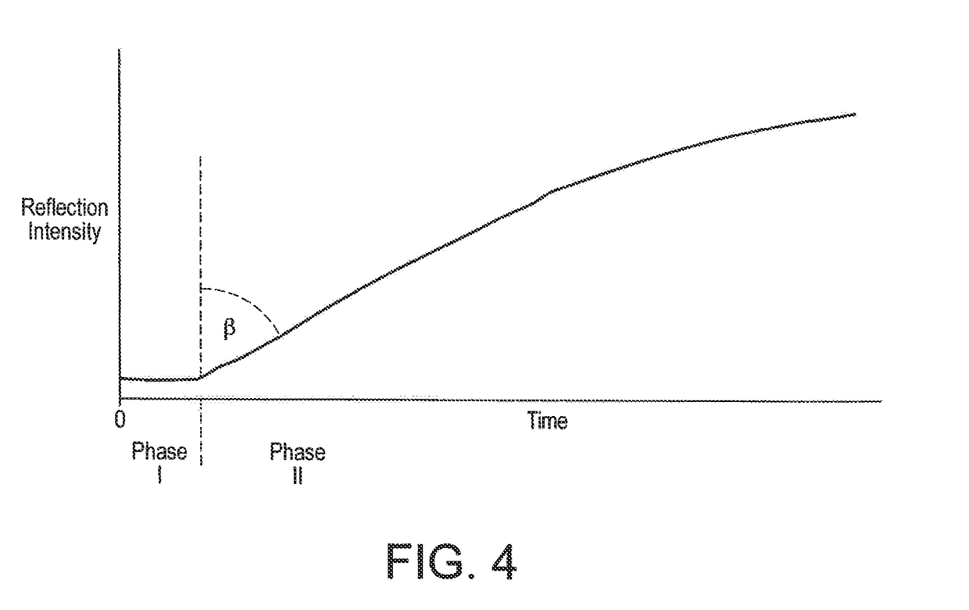
FIG. 4 is a graph showing the relationship between reflected electromagnetic radiation and time according to a first example of the method of peeling tubers using the apparatus of FIG. 1.

In contrast, FIG. 4 shows a typical plot for red or older potatoes which exhibit only a slower and smaller a significant increase in the reflection intensity during the peeling operation which does not level off to a final constant reflection intensity value RI. For such potatoes, the rate of change of the reflection intensity in the second phase II can be represented by the angle β between the plot of the reflection intensity and the Y axis (ordinate); the angle β is larger than the angle α, indicating slower change in the reflection intensity as peeling progresses, although the peeling operation would have substantially the same skin removal rate irrespective of flesh or skin colour for otherwise identical potato batches. The angle β varies between different batches of the same potato variety and between different potato varieties. For such potatoes, a third phase III, exhibiting levelling off to a final constant reflection intensity value RI, is absent, and a fourth phase IV, exhibiting a final constant reflection intensity value RI, is absent.

For such tubers exhibiting a second phase II exhibiting a lower rate of change of the reflection intensity and no third phase III, the method and apparatus of the invention can still be utilized.

In particular, the peeler device 4 may still be controlled to terminate the peeling operation when the rate of change of the measured intensity values reaches a minimum threshold, for example is below a given rate of change, and the rate of change is typically higher used for the potatoes of FIG. 3.

For example, the minimum threshold may be less than 10% or less than 5%, of the measured intensity values. Furthermore, when the rate of change of the measured intensity values reaches the minimum threshold, the peeling operation may be terminated either by terminating operation of the peeling mechanism 8, or by causing peeled tubers to be outputted from the cavity, either immediately or following a predetermined time delay, for example up to 5 seconds. A higher sampling rate and/or a longer second time period may be used to analyze the rate of change of the reflection intensity when the relationship in second phase II is as show in FIG. 4.

The batch of tubers supplied to the peeler device 4 is pre-sorted to have a desired size range, so that in any given batch of tubers to be peeled the tubers have substantially the same dimensions. This pre-sorting protocol is utilized to minimize peel waste and enhance peel uniformity and quality.

A batch of tubers inputted to each peeler device 4 therefore has a selected size range.

An initial tuber supply is sorted in the tuber sorting device 36 described above, which is coupled, directly or indirectly, to the input 10 of the peeler device 4 or pair of peeler devices 4.

The supply of tubers is fed in to the sorting device 36 at the tuber supply end. The tubers pass along the first sorting zone 38. Tubers smaller than the first threshold size d1 fall though the bars 46 of the first sorting zone 38 into a hopper 54. The hopper 54 feeds the sorted tubers of the selected size range d1 to a respective peeler device 4 or pair of peeler devices 4.

Tubers larger than the first threshold size d1 are conveyed along the bars 46 of the first sorting zone 38 to the second sorting zone 40. Typically, the second sorting zone 40 is configured such that in the second sorting zone 40 tubers smaller than the second threshold size d2 fall though the bars 48 of the second sorting zone 40 into a second hopper 54. The second hopper 54 feeds the sorted tubers of the selected size range d2 to a second respective peeler device 4 or pair of peeler devices 4.

Tubers larger than the second threshold size d2 are conveyed along the bars 48 of the second sorting zone 40 to the third sorting zone 52. The third sorting zone 52 may permit all of the remaining tubers to be fed to a respective third peeler device 4 or pair of peeler devices 4. Alternatively, the third sorting zone 52 may correspondingly sort tubers smaller than the third threshold size d3 by falling though the bars 50 of the third sorting zone 52 and tubers larger than the third threshold size d3 are conveyed along the bars 50 of the third sorting zone 52 to a fourth sorting zone (not shown) or to the output end 54 of the tuber sorting device 36.

The present invention has particular application to the peeling of potatoes that are subsequently cut into potato slices for the manufacture of potato chips (crisps). It has been found by the present inventors that the apparatus and method of the preferred embodiments of the present invention, using reflected electromagnetic radiation dynamically to control the termination of the peeling cycle, can achieve a yield gain, measured as reduced loss of potato flesh as a result of over-peeling, of at least 1 wt %. For a typical commercial peeler used in a potato chip manufacturing line, this represents a saving of at least 30 kg per hour of potato flesh which otherwise would be lost to a peel waste stream. Moreover, the apparatus and method of the preferred embodiments of the present invention, using reflected electromagnetic radiation dynamically to control the termination of the peeling cycle, can achieve a more uniform peeling across plural batches of potatoes, of varying age and of different varieties.

Various modifications to the embodiments of the present invention as described above will be apparent to those skilled in the art and such modifications are intended to fall within the scope of the present invention as defined in the appended claims.

The invention claimed is:

1. An apparatus for peeling tubers comprising:
a peeler device defining a cavity surrounded by a peeling mechanism and having an input connected to the cavity for inputting tubers to be peeled into the cavity;
an illumination device for directing electromagnetic radiation into the cavity;
a camera having a lens arranged to detect electromagnetic radiation reflected into the lens from tubers located in the cavity during a peeling operation by the peeling mechanism; and
an operating system for controlling the peeler device based on the reflected electromagnetic radiation detected by the camera.

2. The apparatus of claim 1 wherein the camera lens defines a field of view oriented into the cavity.

3. The apparatus of claim 1 wherein the operating system includes a sampler for sequentially measuring a plurality of intensity values of the detected electromagnetic radiation.

4. The apparatus of claim 3 wherein the operating system further includes a comparator for comparing the measured intensity values to determine a rate of change of the measured intensity values.

5. The apparatus of claim 1, wherein the operating system is adapted to terminate operation of the peeler device.

6. The apparatus of claim 1, wherein the operating system is adapted to cause peeled tubers to be outputted from the cavity.

7. The apparatus of claim 1, wherein the sampler is adapted to measure a preset number of intensity values of the detected electromagnetic radiation; and the operating system further comprises a calculator for calculating an average intensity value representing an average intensity value associated with a particular first time period.

8. The apparatus of claim 7, wherein the calculator is arranged to output the average intensity value to the comparator for comparison against at least one other calculated average intensity value associated with a different first time period than the particular first time period.

9. The apparatus of claim 1, wherein the operating system is adapted to detect a spike of reflected electromagnetic radiation detected by the camera, and to output a calibration signal in response thereto.

10. The apparatus of claim 1, further comprising a tuber sorting device coupled to the input of the peeler device for feeding tubers of a selected size range to the peeler device.

11. The apparatus of claim 10, wherein the tuber sorting device comprises a plurality of sorting zones serially arranged along a conveying direction from a tuber supply end, wherein each sorting zone comprises an array of mutually aligned bars forming a grid, the bars in each sorting zone being mutually separated by a respective spacing distance, wherein the spacing distance in the first sorting zone, which is located towards the tuber supply end, is smaller than the spacing distance in the second sorting zone which is downstream, along the conveying direction, from the first sorting zone, whereby tubers smaller than a first threshold size fall though the bars of the first sorting zone and tubers larger than the first threshold size are conveyed along the bars of the first sorting zone to the second sorting zone.

12. The apparatus of claim 10, wherein the tuber sorting device further comprises a hopper disposed beneath a respective sorting zone of at least one of the plurality of sorting zones for receiving tubers falling though the bars of the respective sorting zone.

13. A method of peeling tubers, the method comprising the steps of:

(a) providing a peeler device defining a cavity surrounded by a peeling mechanism;
(b) inputting tubers to be peeled into the cavity;
(c) directing electromagnetic radiation from an illumination device into the cavity;
(d) detecting electromagnetic radiation reflected into lens of a camera from tubers located in the cavity during a peeling operation by the peeling mechanism; and
(e) operating the peeler device based on the reflected electromagnetic radiation detected by the camera.

14. The method of claim 13 wherein, operating step (e) comprises sequentially measuring a plurality of intensity values of the detected electromagnetic radiation.

15. The method of claim 14 wherein, operating step (e) further comprises comparing the measured intensity values to determine a rate of change of the measured intensity values.

16. The method of claim 13, wherein the operating step (e) is configured to terminate operation of the peeler device.

17. The method of claim 13, wherein the operating step (e) is configured to cause peeled tubers to be outputted from the cavity.

18. The method of claim 13, wherein operating step (e) comprises sub-steps of detecting a spike of reflected electromagnetic radiation by the camera; and outputting a calibration signal in response thereto.

19. The method of claim 13, wherein the tubers inputted in step (b) are tubers of a selected size range and the method further comprises the step, before step (a) sorting the tubers in a tuber sorting device coupled, directly or indirectly, to the input of the peeler device, or to the respective inputs of a plurality of peeler devices, for sorting out the tubers inputted in step (b).

* * * * *